(12) United States Patent
Dixon (10) Patent No.: US 12,093,546 B2
(45) Date of Patent: Sep. 17, 2024

(54) OPERATING MULTIPLE STORAGE DEVICES USING NVM INTERFACE

(71) Applicant: Seagate Technology LLC, Fremont, CA (US)

(72) Inventor: Robert William Dixon, Longmont, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 17/190,285

(22) Filed: Mar. 2, 2021

(65) Prior Publication Data

US 2022/0283721 A1 Sep. 8, 2022

(51) Int. Cl.
*G06F 3/06* (2006.01)

(52) U.S. Cl.
CPC .......... *G06F 3/0635* (2013.01); *G06F 3/0611* (2013.01); *G06F 3/0622* (2013.01); *G06F 3/0653* (2013.01); *G06F 3/0659* (2013.01); *G06F 3/067* (2013.01); *G06F 3/0683* (2013.01)

(58) Field of Classification Search
CPC .... G06F 3/0635; G06F 3/0611; G06F 3/0622; G06F 3/0653; G06F 3/0659; G06F 3/067; G06F 3/0683
See application file for complete search history.

(56) References Cited

U.S. PATENT DOCUMENTS

| | | | |
|---|---|---|---|
| 5,504,882 A | 4/1996 | Chai et al. | |
| 5,678,023 A | 10/1997 | Adams et al. | |
| 5,778,374 A | 7/1998 | Dang et al. | |
| 6,332,139 B1 | 12/2001 | Kaneko et al. | |
| 6,560,155 B1 | 5/2003 | Hush | |
| 6,766,420 B2 | 7/2004 | Rawson, III | |
| 6,959,399 B2 | 10/2005 | King et al. | |
| 6,986,075 B2 | 1/2006 | Ackaret et al. | |
| 7,124,272 B1 | 10/2006 | Kennedy et al. | |

(Continued)

FOREIGN PATENT DOCUMENTS

WO 2014065841 A1 5/2014

OTHER PUBLICATIONS

Ahmadian, Saba, Farhad Taheri, and Hossein Asadi. "Evaluating reliability of SSD-based I/O caches in enterprise storage systems." IEEE Transactions on Emerging Topics in Computing 9.4 (2019): 1914-1929. (Year: 2019).*

(Continued)

*Primary Examiner* — Nicholas J Simonetti
(74) *Attorney, Agent, or Firm* — HOLZER PATEL DRENNAN (57) ABSTRACT

The technology disclosed herein provides a system including multiple selectable storage devices in an enclosure communicatively coupled to shared control electronics the shared control electronics including a first controller for selecting a storage device of the multiple selectable storage devices for execution of a device access command, the multiple scalable storage devices including a plurality of NVM storage devices and at least one hard disc drive (HDD) and a first signal path for transmitting a drive selection instruction from a host external to the enclosure to a first controller the first signal path being a PCIe electronic interface configured to communicate with a host, wherein the plurality of NVM storage devices shares a capacitor bank for power loss protection.

16 Claims, 5 Drawing Sheets

(56) References Cited

U.S. PATENT DOCUMENTS

| | | | |
|---|---|---|---|
| 7,210,005 | B2 | 4/2007 | Guha et al. |
| 7,237,129 | B2 | 6/2007 | Fung |
| 7,318,164 | B2 | 1/2008 | Rawson, III |
| 7,334,140 | B2 | 2/2008 | Jones et al. |
| 7,434,090 | B2 | 10/2008 | Hartung et al. |
| 7,443,759 | B1 | 10/2008 | Rowlands et al. |
| 7,516,348 | B1 | 4/2009 | Ofer |
| 7,568,122 | B2 | 7/2009 | Mechalke et al. |
| 7,699,023 | B2 | 2/2010 | Murase |
| 7,673,167 | B2 | 3/2010 | Elliott et al. |
| 7,702,853 | B2 | 4/2010 | Hetzler et al. |
| 7,859,834 | B2 | 12/2010 | Fukuda et al. |
| 8,024,602 | B2 | 9/2011 | DeCenzo et al. |
| 8,127,165 | B2 | 2/2012 | Qi et al. |
| 8,161,317 | B2 | 4/2012 | Ishii et al. |
| 8,412,986 | B2 | 4/2013 | Ishii et al. |
| 8,473,779 | B2 | 6/2013 | Siewert et al. |
| 8,495,276 | B2 | 7/2013 | Han et al. |
| 8,522,058 | B2 | 8/2013 | Chang et al. |
| 8,583,838 | B1 | 11/2013 | Marshak et al. |
| 8,947,816 | B1 | 2/2015 | Ryan et al. |
| 11,403,000 | B1* | 8/2022 | Barker, Jr. ............ G06F 3/0664 |
| 2005/0228943 | A1 | 10/2005 | DeCenzo et al. |
| 2006/0004868 | A1 | 1/2006 | Claudatos et al. |
| 2006/0062383 | A1 | 3/2006 | Kaneda et al. |
| 2007/0220316 | A1 | 9/2007 | Guha |
| 2008/0276033 | A1 | 11/2008 | DeCenzo |
| 2009/0089504 | A1 | 4/2009 | Soran et al. |
| 2009/0150593 | A1 | 6/2009 | Hamilton et al. |
| 2009/0249003 | A1 | 10/2009 | Bates et al. |
| 2010/0011229 | A1 | 1/2010 | Davis et al. |
| 2010/0138677 | A1 | 6/2010 | Pagan et al. |
| 2010/0332863 | A1* | 12/2010 | Johnston ............ G11B 19/2054 365/228 |
| 2011/0239013 | A1 | 9/2011 | Muller |
| 2011/0304211 | A1* | 12/2011 | Peterson ................... G06F 1/30 307/65 |
| 2012/0210169 | A1 | 8/2012 | Coile et al. |
| 2012/0233484 | A1 | 9/2012 | Rossi |
| 2012/0272038 | A1 | 10/2012 | Wei et al. |
| 2012/0297114 | A1 | 11/2012 | Koizumi et al. |
| 2013/0304963 | A1 | 11/2013 | Luo et al. |
| 2014/0281194 | A1 | 9/2014 | Gaertner et al. |
| 2014/0297700 | A1 | 10/2014 | Vongsouvanh |
| 2015/0026488 | A1 | 1/2015 | El-Batal et al. |
| 2015/0046747 | A1* | 2/2015 | Gaertner ............ G06F 11/1666 714/6.11 |
| 2015/0197330 | A1 | 7/2015 | Mayer et al. |
| 2015/0331476 | A1 | 11/2015 | Slik |
| 2015/0331632 | A1 | 11/2015 | Slik |
| 2015/0362968 | A1 | 12/2015 | Jurey et al. |
| 2015/0362972 | A1 | 12/2015 | Frick |
| 2015/0362983 | A1 | 12/2015 | Frick |
| 2015/0363109 | A1* | 12/2015 | Frick ..................... G06F 3/0659 711/112 |
| 2015/0363126 | A1 | 12/2015 | Frick |
| 2015/0363127 | A1 | 12/2015 | Frick |
| 2015/0363288 | A1 | 12/2015 | Frick |
| 2015/0380968 | A1* | 12/2015 | Lee ........................... G06F 1/30 713/300 |
| 2017/0192476 | A1* | 7/2017 | Shaw .................. G06F 13/4022 |
| 2017/0199693 | A1* | 7/2017 | Fong .................... G06F 3/0679 |
| 2017/0242613 | A1* | 8/2017 | Shaw, II ............... G06F 3/0688 |
| 2019/0250852 | A1* | 8/2019 | Kabra ..................... G06F 3/067 |
| 2019/0347222 | A1* | 11/2019 | Allo ......................... G11B 5/82 |
| 2020/0104237 | A1 | 4/2020 | Naveen et al. |
| 2020/0274952 | A1 | 8/2020 | Waskiewicz et al. |

OTHER PUBLICATIONS

Jung, Sanghyuk, and Yong Ho Song. "Data loss recovery for power failure in flash memory storage systems." Journal of Systems Architecture 61.1 (2015): 12-27. (Year: 2015).*

Miller, John R. "Introduction to electrochemical capacitor technology." IEEE Electrical Insulation Magazine 26.4 (2010): 40-47. (Year: 2010).*

Wu, Xiaojian, and Al Narasimha Reddy. "A Novel Approach to Manage a Hybrid Storage System." J. Commun. 7.7 (2012): 473-483. (Year: 2012).*

Caulfield, et al., "Moneta: A High-performance Storage Array Architecture for Next-generation, Non-volatile Memories," Dept. of Computer Science & Engineering, U.C. San Diego, California, 2010, 11 pages.

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seatage, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from:http://www.quantum.com/serviceandsupport/softwareanddocumentationdownloads/dx100/index.aspx.

* cited by examiner

OPERATING MULTIPLE STORAGE DEVICES USING NVM INTERFACE

BACKGROUND

Efficient use of power is an important aspect of running data storage devices, especially in embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

SUMMARY

The technology disclosed herein provides a system including multiple selectable storage devices in an enclosure communicatively coupled to shared control electronics the shared control electronics including a first controller for selecting a storage device of the multiple selectable storage devices for execution of a device access command, the multiple scalable storage devices including a plurality of NVM storage devices and at least one hard disc drive (HDD) and a first signal path for transmitting a drive selection instruction from a host external to the enclosure to a first controller the first signal path being a PCIe electronic interface configured to communicate with a host, wherein the plurality of NVM storage devices shares a capacitor bank for power loss protection.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

DETAILED DESCRIPTION

Efficient use of power is an important aspect of running data storage devices, especially in embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

Near-line (or near on-line) mass data storage refers to one or more interconnected data storage units that are powered on, but kept a low power consumption state when not in use and brought to an on-line state before running data access operations. Hard disk, optical, and/or flash memory drives may be used for near-line storage, with an additional mechanism to bring a selected storage unit to an on-line state for data access operations. Such example mechanisms are robotic near-line storage (i.e., the system is aware of where a desired data chunk resides on a physical volume and utilizes a robotic mechanism to retrieve the physical volume for data access operations) and HDD near-line storage (e.g., a massive array of idle discs ("MAID")). MAID systems archive data in an array of HDDs that are operating in a standby power state, most of which are not spinning. The MAID system spins up each HDD on demand when desired to perform data access operations on a disc within that drive. Typically, TTD for MAID-type near-line mass data storage units is less than 4 milliseconds. Near-line mass data storage systems have lower operating costs than on-line mass data storage systems due to the reduced power demand, but may have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for data access operations. In off-line tape mass data storage units, the desired tape is often manually retrieved and loaded. As a result, TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line mass data storage systems includes HDDs as well as NVM storage devices and an NVMe controller that can be used to communicate between shared electronics supporting the HDDs and the NVM storage devices and host. Such off-line mass data storage systems can achieve TTD much faster than that of off-line tape mass data storage while maintaining build and operating costs competitive with off-line tape mass data storage. This is accomplished, in part, with a common controller operating multiple storage resources via an array of switches within the off-line mass data storage system.

Figure 1:
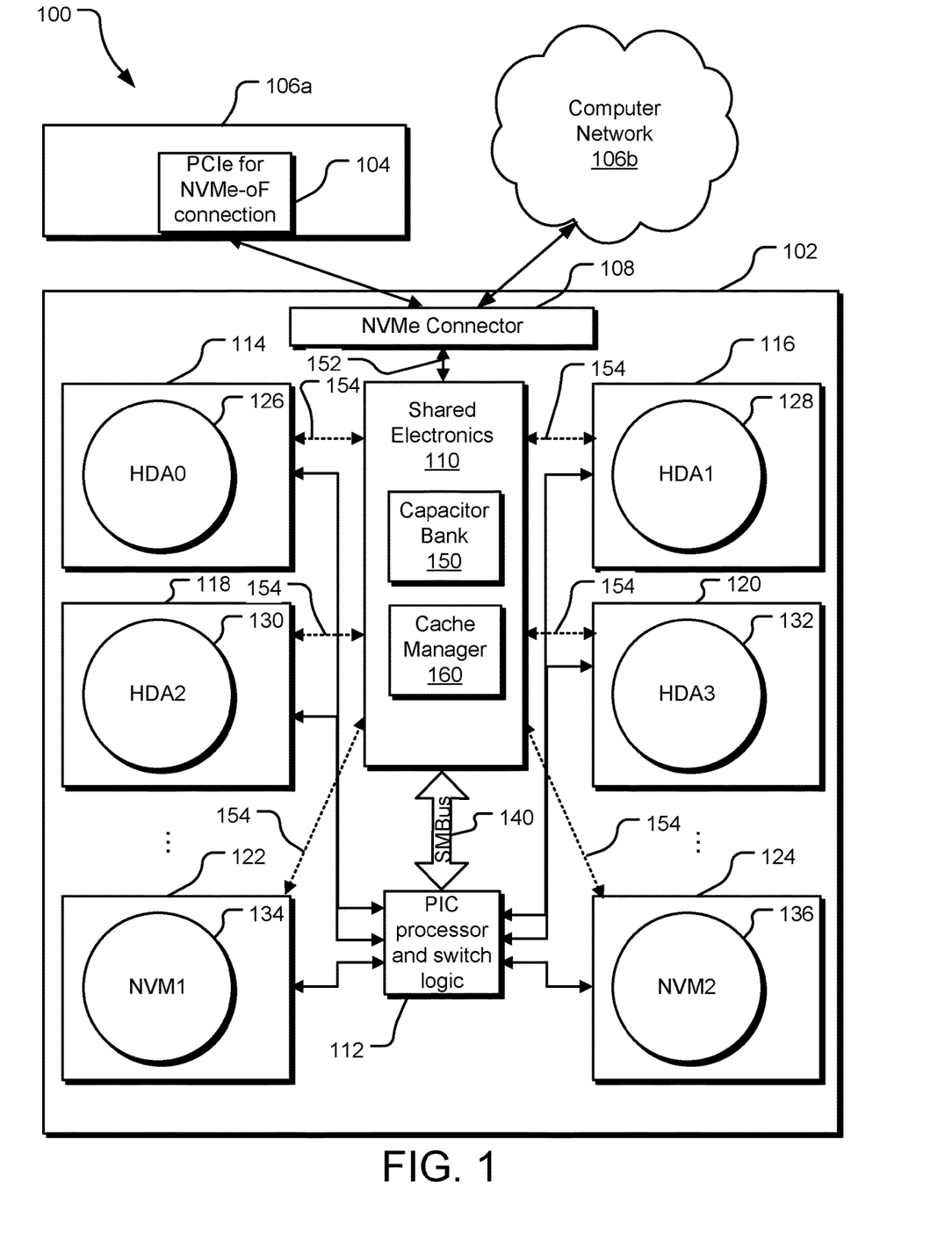
FIG. 1 illustrates an example mass data storage system with shared control electronics using an NVMe interface to operate multiple storage devices.

FIG. 1 illustrates a mass data storage system 100 with shared control electronics using an NVM interface to operate multiple storage devices. In one implementation, the mass data storage system 100 includes an off-line storage system 102 including a large number of storage devices 114-124 that shares shared electronics 110. The storage devices 114-124 may include some hard disc drive assembly storage devices such as HDA0 126 to HDA3 132.

Other storage devices may include NVM storage devices, such as NVM1 134, NVM2 136, etc. Furthermore, each of the NVM storage devices 134, 136 may be different from each other. For example, the NVM storage device 134 may be a single level cell (SLC) NAND storage flash, whereas the NVM storage device 136 may be a multi-level cell (MLC) NAND flash. Alternatively, other types of NAND flash devices, such as a two bits per cell flash; triple-level cell (TLC) flash or three bits per cell flash, and quad-level cell (QLC) or four bits per cell flash.

In one implementation, the shared electronics 110 is configured to communicate with the NVMe connector 108 via a PCIe interface 152. On the other hand, the shared electronics 110 may communicate with the PIC processor and switch logic 112 via an SMBus 140. A plurality of high speed data paths 154 are configured between the storage devices 114-124 and the shared electronics 110.

The shared electronics 110 may include a capacitor bank 150 that is shared by the storage devices 114-124. In one implementation, the capacitor bank 150 is charged using back electromagnetic field (EMF) generated during spinning down of at least one of the hard disc drive assemblies 114-120. For example, the spinning down of the HDA0 126 may charge the capacitor bank 150. In one implementation, the PIC processor and the switch logic 112 may control the charging of the capacitor bank 150 based on the current spinning down of one or more of the HDAs 114-120.

In one implementation, the capacitor bank 150 is also used to provide charge for spinning up one of the HDAs 114-120. The PIC processor and the switch logic 112 may control the spinning up of one or more of the HDAs 114-120 using the charge on the capacitor bank 150. Alternatively, the charge on the capacitor bank 150 may be used for maintaining the charge level for the NVM storage devices, such as NVM1 134 and NVM2 136.

In one implementation, the shared electronics 110 also communicates with each of the storage devices 114-124 via PCIe interface. Such PCIe interface provides reduced latency for communication between the shared electronics 110 and the storage devices 114-124. As a result, the shared electronics 110 is capable of providing enhanced data sharing and management services between the storage devices 114-124. In an alternative implementation, each of the storage devices 114-124 communicates with the shared electronics 110 via another high speed interface such as a read channel to an HDAs 126-132 or multiple channels to a flash array of the NVMs 134, 136.

For example, the shared electronics 110 may also include a cache manager 160 that is configured to manage the cache of the HDAs 114-120. As the HDAs 114-120 are communicatively connected via a high speed interface such as a PCIe interfaces with one or more of the NVM storage devices NVM1 134 and NVM2 136, in one implementation, the cache manager 160 configures the NVM storage device NVM1 134 and NVM2 136 to be used as cache for one or more of the HDAs 114-120. For example, the cache manager 160 may designate part of logical block addresses (LBAs) of the NVM1 134 as the cache space for MAO 126 and HDA2 130, whereas part of the LBAs of the NVM2 136 may be designated as cache space for HDA1 128 and HDA3 132.

In one implementation, only write cache of the HDAs 114-120 is stored in the NVM storage devices 122-124. Alternatively, the cache manager 160 is configured so that the NVM storage devices NVM1 134 and NVM2 136 are used as cache for the HDAs 114-120 only during the spinning up phase of the HDAs 114-120. Once the HDAs 114-120 have spun-up to a threshold level, the data from the NVM1 134 and NVM2 136 used as cache is transferred to write cache resident on the HDAs 114-120. Yet alternatively, the HDAs 114-1120 are configured to have no on-board cache at all. In such implementation, the NVM storage devices 134-136 are used for as cache for the HDAs 114-1120 throughout the life cycle of the HDAs 114-1120.

In the illustrated implementation, the off-line storage system 102 also includes a peripheral interface control (PIC) processor and switch logic unit 112 that communicates using a system management bus (SMbus) with the shared electronics. However, in alternative implementations, the PIC processor and switch logic unit 112 may communicate with the shared drive electronics using other communication bus.

The shared electronics 110 may communicate using an NVMe connector 108 with a host 106a. In one implementation, the NVMe connector 108 may communicate with the host 106a that is using an PCIe interface 104 configured to communicate across physical interfaces such as ethernet or fiber channel using NVMe over fabric (NVMe-oF) protocol. The NVMe connector 108 may also allow the off-line storage system 102 to communicate with external computer network 106b, such as the Internet.

Figure 2:
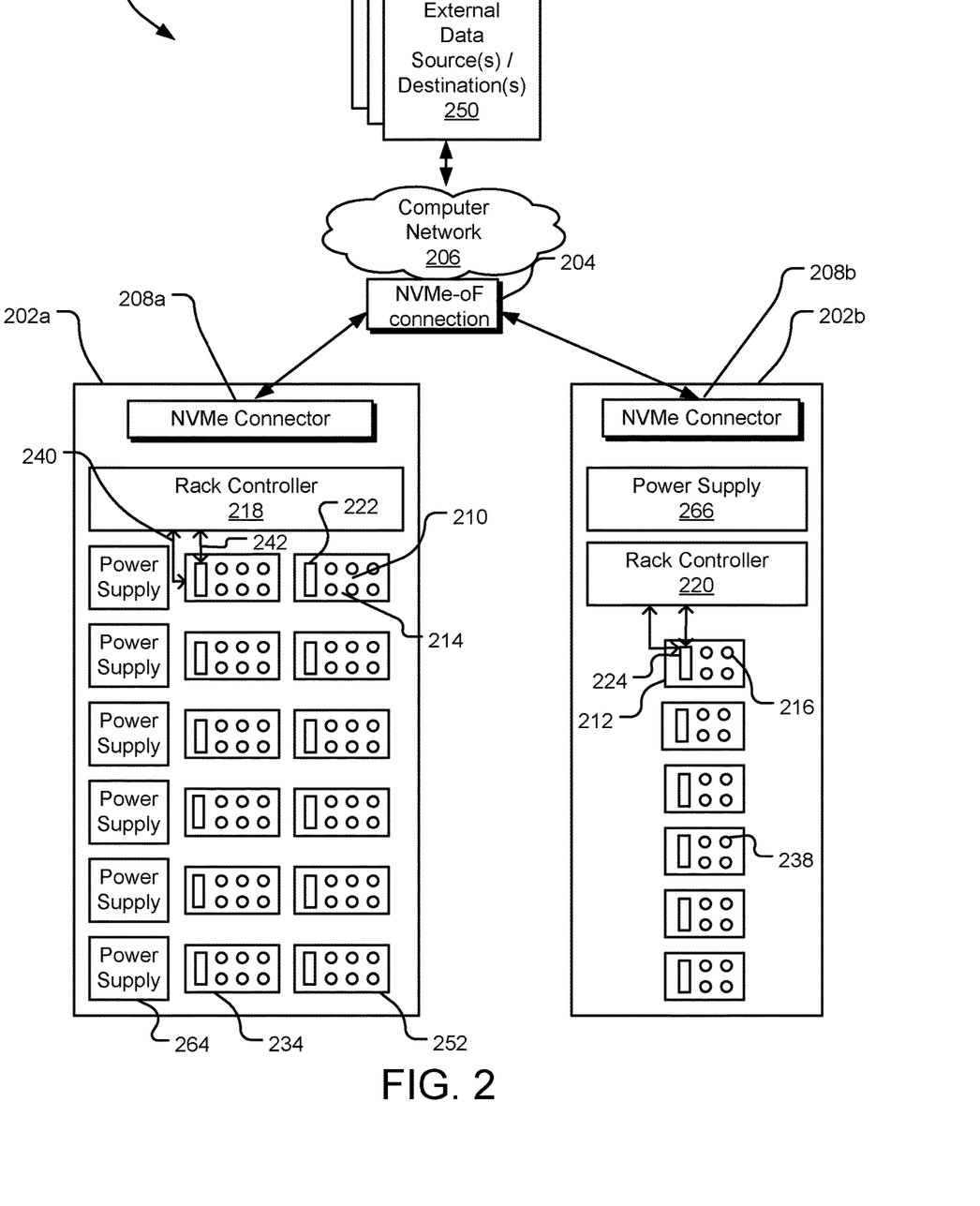
FIG. 2 illustrates an example mass data storage system with multiple media unit controllers, each operating multiple storage drives.

FIG. 2 illustrates an example mass data storage system 200 with multiple media unit controllers (e.g., media unit controllers or zone boards 222, 224); each media unit controller operating multiple storage resources (e.g., storage drives 214, 216, 238) within the system 200. The storage system 200 (e.g., a server cluster or farm) includes a number of storage racks (e.g., storage racks 202a, 202b) oriented in adjacent or separate physical locations or facilities (e.g., data rooms or centers). In some implementations, a first quantity of storage racks is located in a first server facility, a second quantity of storage racks is located in a second server facility, and so on. The server facilities may be separated by any distance (e.g., several feet or many miles). The storage system 200 may accommodate any number of storage racks and each rack is located in one of any number of server facilities. The storage system 200 may accommodate any use of mass data storage (e.g., content delivery, backup, archiving, etc.).

The individual storage racks 202a and 202b are interconnected to one another via a computer network 206 (e.g., an Ethernet or a custom interconnect network). In the illustrated implementation, each of the individual storage racks includes NVMe interface, namely, NVMe connectors 208a and 208b. The NVMe connectors 208a and 208b are used to communicatively connect the storage racks 202a and 202b to the network 206 using an NVMe-oF connection 204. Further, the interconnected storage racks 202a and 202b may be connected to one or more external data source(s) and/or destination(s) 250 via the same computer network 206 or an additional interconnected network (e.g., a local area network ("LAN") or a wide area network ("WAN"), not shown). Communication between the storage racks 202a, 202b, computer network 206, and the external data source(s) and/or destination(s) 250 may occur using a variety of communication protocols (e.g., NVMoF, transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and the external data source(s) and/or destination(s) 250 as desired.

Each individual storage rack 202a and 202b includes an array of storage media units (also referred to as physical zones), each of which is selectively powered by one or more power supplies and controlled by a rack controller (alternatively referred to as a "storage rack server," a "storage system server," or an "expander"). For example, storage rack 202a includes 12 individual storage media units (e.g., storage media unit 210) and 6 individual power supplies (e.g., power supply 264), all of which are controlled by rack controller 218. Storage rack 202b includes 6 individual storage media units (e.g., storage media unit 212) and 1 power supply 266 controlled by rack controller 220. In some implementations, individual storage racks may include greater or fewer individual storage media units than the depicted 12 and 6 storage media units per storage rack and/or greater or fewer individual power supplies than the depicted 6 and 1 power supplies per storage rack. In other implementations, some racks may not include a rack controller at all. In such implementations, some or all of the functionality of the rack controller is moved to a rack controller in another rack and/or individual media unit controllers within the same rack. As a result, an individual rack controller may control multiple racks.

Each media unit within a storage rack 202a, 202b includes an array of individual storage drives controlled by a media unit controller. For example, the media unit 210 includes 6 individual storage drives (e.g., the storage drive 214) controlled by the media unit controller (or zone board) 222. The media unit 212 includes 4 individual storage drives (e.g., the storage drive 216) controlled by the media unit controller 224. In other implementations, individual storage media units may include greater or fewer storage drives than the depicted 6 and 4 storage drives per media unit.

The power supplies may power multiple media units or a single media unit. For example, each power supply in storage rack 202a powers a pair of media units (e.g., power supply 264 powers media units 234, 252). Power supply 266 powers all 6 media units in storage rack 202b. An upper end power capability of each individual power supply may determine how many storage drives may be operated simultaneously by that power supply, which may range from a single storage drive to multiple storage drives operating across the same or different media units. In still other implementations, an individual power supply may power multiple racks.

In some implementations, physical collections of media units and/or power supplies are selectively installed and uninstalled from a storage rack (e.g., configured as a blade, which corresponds to the storage rack physical configuration). In an example standard server-rack configuration, the individual storage racks are each subdivided into individual rack units (e.g., 42 rack units), where a pair of media units and one power supply are physically dimensioned to fill one rack unit (i.e., 19 inches wide by 1.75 inches tall). Each such storage rack can therefore accommodate a total of 84 media units and 42 power supplies. In other implementations, the storage rack and rack units are physically dimensioned to accommodate any desired number of media units and/or power supplies.

In one implementation, each storage drive is a distinct storage medium or set of storage media with a portion of the read/write control functionality of the storage drive removed to a corresponding media unit controller and/or rack controller of the mass data storage system 200. As a result, one or both of the media unit controller and/or the rack controller can selectively power (e.g., power-on, power-off, spin-up, spin-down, etc.) an individual storage drive as desired to read data from and/or write data to the storage drive without having to supply power to all storage drives within the system 200 continuously. As used herein, the term "off state" refers to a state where no power is supplied to a storage drive and "on state" refers to any state where power is supplied to the storage drive. One example selective powering operation powers a storage resource from an off state to an on state. In the on state, the storage drive can perform normal data transfer operations (e.g., read and write operations).

Some read/write control functionality of the storage drives may be retained within the storage drives and thus not removed to the corresponding media unit controller or rack controller of the mass storage system 200. Such storage drives may retain self-powering resources and have the ability to effectuate a "power on" or "power off" mode change in response to communication from a rack controller or a media unit controller.

Some of the control hardware and software for each individual storage drive is removed to a corresponding media unit controller and/or rack controller, thereby centralizing control functions of the individual storage drives to a media unit level and/or a rack level. By moving some or all of the storage drive control hardware and software into the corresponding media unit controller and/or rack controller, the individual storage drives may have disparate characteristics (e.g., storage technology (e.g., magnetic, optical, semiconducting), performance characteristics and power characteristics). Further, the individual storage drives may utilize any available storage technology (e.g., magnetic storage, optical storage, semiconducting storage (e.g., flash-based solid state)).

Operation of the mass data storage system 200 may then be optimized based on the characteristics of the storage drives available within the system 200. In some implementations, each of the individual storage drives within a media unit has disparate characteristics, but each media unit has the same characteristics (i.e., similar within industry acceptable tolerances). In other implementations, the media units have disparate characteristics as well.

Drives with performance characteristics that meet an operational threshold may be characterized as having the same (or similar) performance characteristics. For example, a 4 terabyte drives have the capability of storing at least 4 terabytes of data and is formatted to store 4 terabytes of data. Drives that meet this threshold are referred to herein as having the same or similar storage capacity. Drives that do not have the capability of storing 4 terabytes of data and/or drives that are formatted to store a different quantity of data are referred to herein as having disparate storage capacity.

Drives with performance characteristics that maintain an operational target may also be characterized as having the same (or similar) performance characteristics. Similarly, a 7200 RPM storage drive may vary rotational speed from 7200 RPM by no more than 1% during data access operations. Drives that meet this operating limitation are referred to herein as having the same or similar rotational speeds. Drives that fail to meet this operating limitation are referred to herein as having disparate rotational speeds. Storage capacity and rotational speed are two example storage drive performance capabilities. Other performance capabilities are contemplated herein (e.g., read speed, write speed, host interface speed, security level (e.g., encoded or not encoded), etc.).

Each of the rack controllers 218, 220 are communicatively coupled to the media unit controllers within corresponding racks 202a, 202b, respectively, and media unit controllers (e.g., media unit controller 222) are communicatively coupled to an associated nest of storage drives (e.g., storage drive 214). Communication between the rack controllers, the media unit controllers, and the storage drives is accomplished via compute nodes, inter-integrated circuits ("I2C"), serial attached small computer system interface ("SAS"), serial advanced technology attachment ("SATA"), universal serial bus ("USB"), peripheral component interconnect express ("PCIe"), Ethernet, wireless channels, etc.

For example, in response to a read or write command, the mass data storage system 200 uses the detailed mapping of the power network and storage resources within the system 200 to identify available storage locations to receive data (if the command is a write command) or act as a data source (if the command is a read command). Using a number of power constraints and data requirements, the rack controller instructs one or more media units to each connect and power up a storage drive and ready it for read and write operations. The media unit controllers switch power to the selected drive, power on the selected drive, and connect a read/write channel to the selected drive. After execution of the read or write command, the selected drives are returned to an off-line (powered off) state. Storage resources selectively powered for each data transfer operation (e.g., read operation or write operation) may be on the same or different media units and/or storage racks.

Each of the media unit controllers (e.g., the media unit controller 222) is communicatively coupled to the corresponding rack controller (e.g., the rack controller 218) across two different signal paths, such as a drive access path 240 and a control path 242. The access path 240 and the control path 242 may be implemented using a PCIe connection. In one implementation, the rack controller 218, 220 utilizes the control path 242 to select and configure a storage resource for a particular read or write operation while sending all read/write commands across the drive access path 240. Control interfaces for each of the drive access path 240 and control path 242 provide for independent selection, powering, and data accessing to the various storage resources in each of the media units.

In one implementation, some of the media units on each of the racks 202a, 201b may be HDD media and some of the media units may be NVM media. Furthermore, the rack controller 218 may also be configured to have a capacitor bank that can be shared by the media units 234, 252. In alternative implementation, the rack controller 218 may have a cache manager that is configured to use an NVM media unit as cache for the HDD media unit.

Figure 3:
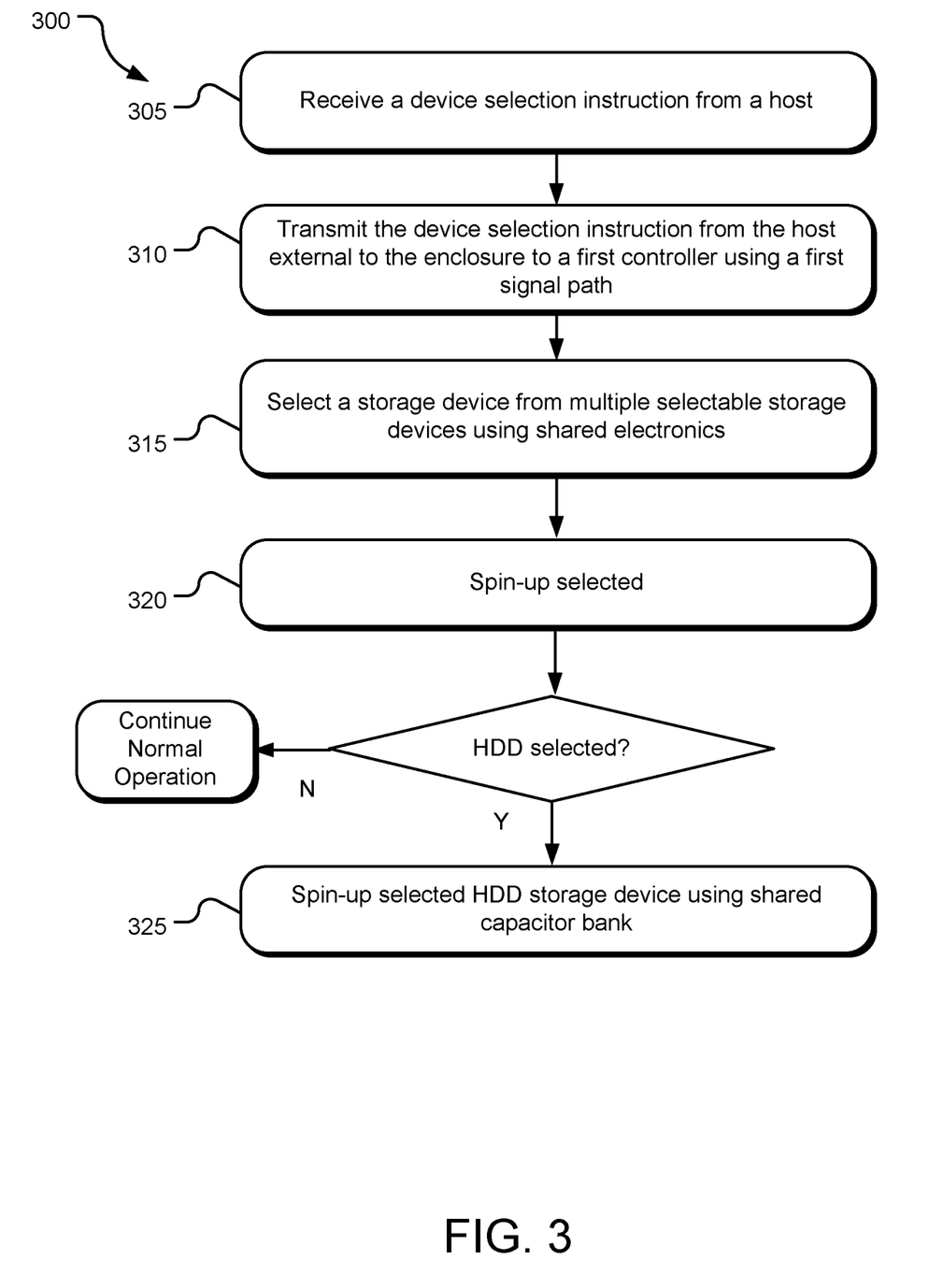
FIG. 3 illustrates example operations for operating multiple storage devices within a mass data storage system having from shared control electronics.

FIG. 3 illustrates operations 300 for operating multiple storage devices within a mass data storage system having from shared control electronics. An operation 305 receives a device selection instruction from a host. In one implementation, the device selection instruction may be received over an PCIe interface. For example, the host may have an NVMe-oF connector that communicates to an NVMe connector on the enclosure over the PCIe interface. An operation 310 transmits the device selection instruction from the host external to the enclosure to a first controller using a first signal path. In one implementation, the first signal path may be a PCIe electronic interface configured to communicate with the host.

An operation 315 selects a storage device from multiple selectable storage devices in the enclosure for execution of a device access command. Here the multiple selectable storage devices may be configured in the enclosure where the enclosure communicatively coupled to shared control electronics and the multiple scalable storage devices includes one or more NVM storage devices and at least one hard disc drive (HDD). An operation 320 determines whether the selected storage device is an HDD device. In one implementation, where the device selection instruction selects a HDD device of the plurality of storage devices in the enclosure, an operation 325 may use a shared capacitor bank to spin up the selected HDD device.

Figure 4:
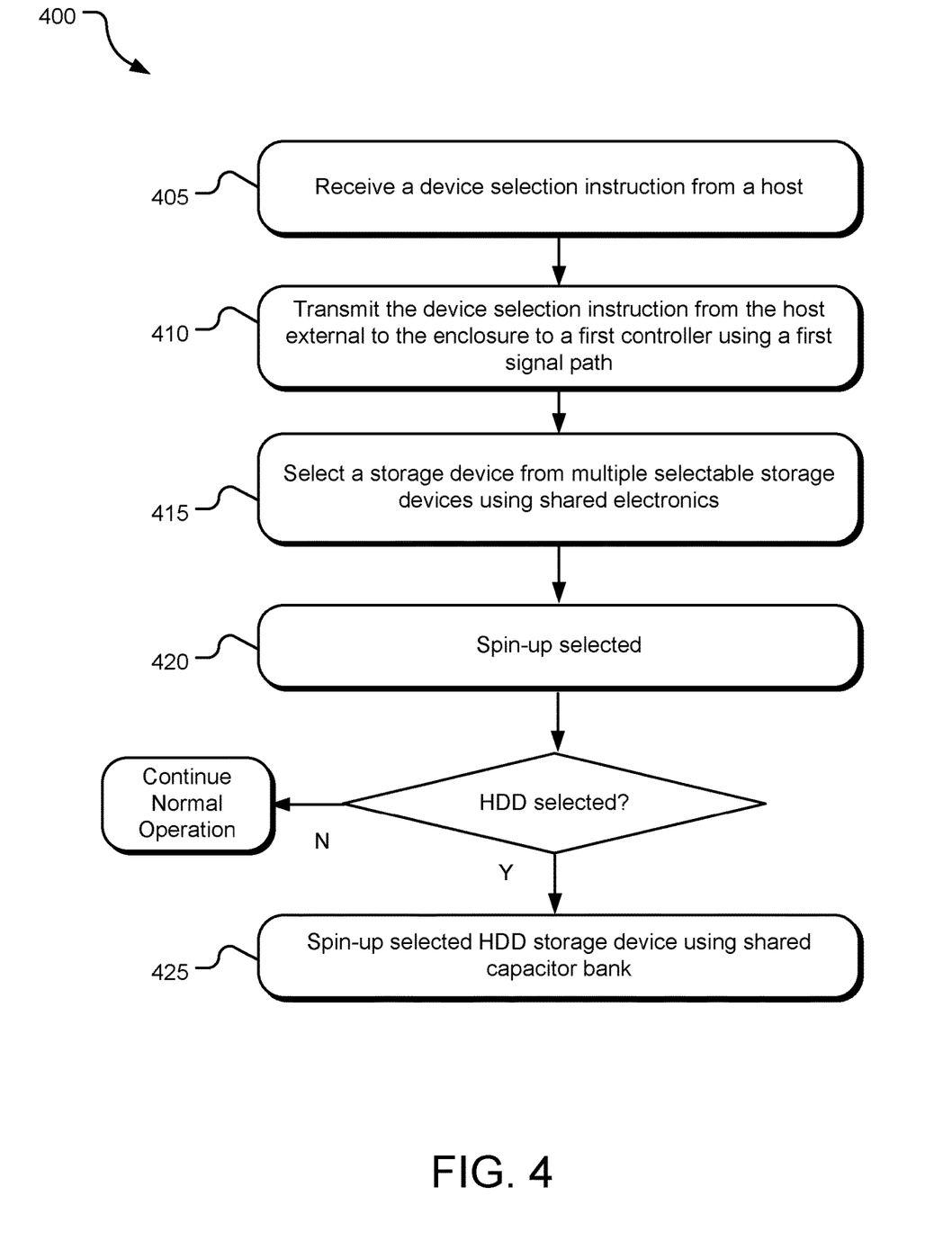
FIG. 4 illustrates alternative example operations for operating multiple storage devices within a mass data storage system having from shared control electronics.

FIG. 4 illustrates alternative operations 400 for operating multiple storage devices within a mass data storage system having from shared control electronics. One or more of the operations 400 may be substantially similar to the one or more operations discussed above with respect to FIG. 3. Specifically, an operation 405 receives a device selection instruction from a host. In one implementation, the device selection instruction may be received over an PCIe interface. For example, the host may have an NVMe-oF connector that communicates to an NVMe connector on the enclosure over the PCIe interface. An operation 310 transmits the device selection instruction from the host external to the enclosure to a first controller using a first signal path. In one implementation, the first signal path may be a PCIe electronic interface configured to communicate with the host.

An operation 415 selects a storage device from multiple selectable storage devices in the enclosure for execution of a device access command. Here the multiple selectable storage devices may be configured in the enclosure where the enclosure communicatively coupled to shared control electronics and the multiple scalable storage devices includes one or more NVM storage devices and at least one hard disc drive (HDD). An operation 420 determines whether the selected storage device is an HDD device.

In one implementation, where the device selection instruction selects a HDD device of the plurality of storage devices in the enclosure, an operation 425 may designate one of the NVM device as cache for the selected HDD device. In one implementation, the NVM device is selected as cache for the HDD device for the ramp up period. Alternatively, the NVM device may be used as cache for the HDD device during the usage of the HDD device in response to its selection by the host. Allowing the usage of the NVM device as cache for the HDD device is made possible due to usage of PCIe or other high speed communication connections between various storage devices in the enclosure as well as between the storage devices and the shared electronics in the enclosure.

Figure 5:
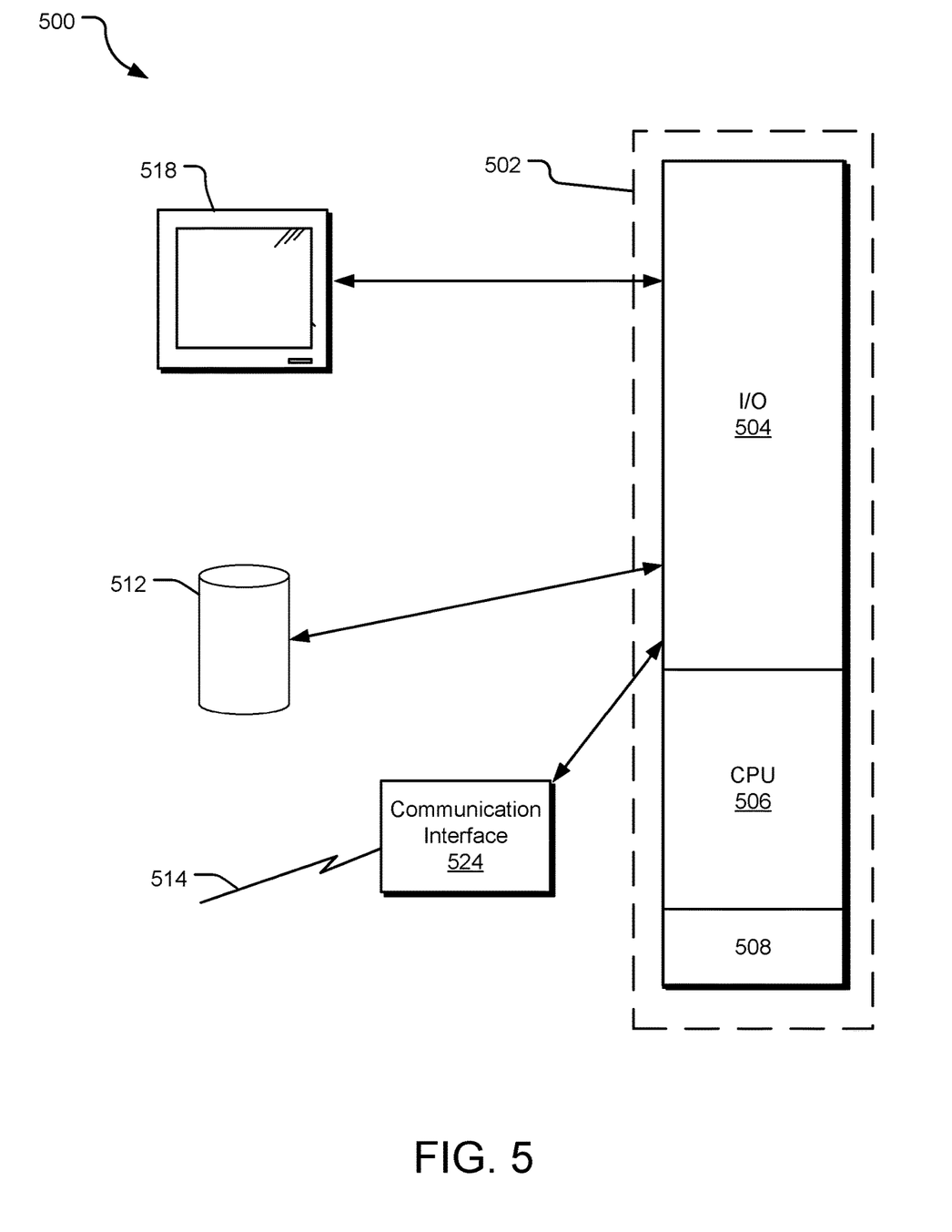
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising: multiple selectable storage devices in an enclosure communicatively coupled to shared control electronics, the shared control electronics including a first controller for selecting a storage device of the multiple selectable storage devices for execution of a device access command, the multiple selectable storage devices including a plurality of NVM storage devices and at least one hard disc drive (HDD); and a first signal path for transmitting a drive selection instruction from a host external to the enclosure to the first controller the first signal path being a PCIe electronic interface configured to communicate with the host, wherein each of the plurality of NVM storage devices and the at least one hard disc drive (HDD) are configured to communicate with the host using the PCIe electronic interface via the shared control electronics, and wherein the plurality of NVM storage devices and the at least one HDD shares a capacitor bank for power loss protection and the shared control electronics controls (a) charging of the capacitor bank based on current spinning down of the at least one HDD, (b) spinning up of the at least one HDD, and (c) maintaining a charge level of the plurality of NVM storage devices using a charge on the capacitor bank.

2. The system of claim 1, wherein the at least one of the plurality of NVM storage device is used to store firmware for the at least one HDD.

3. The system of claim 1, wherein the at least one of the plurality of NVM storage device is used as write cache for the at least one HDD during spinning up of the at least one HDD.

4. The system of claim 1, wherein the PCIe electronic interface is an NVMe interface.

5. The system of claim 4, wherein the NVMe interface is configured to communicate with the host via an NVMe-oF interface.

6. The system of claim 1, wherein the shared control electronics including a second controller for executing the device access command on the selected storage device.

7. The system of claim 1, further comprising a second signal path for transmitting the device access command from the host to the second controller, the second signal path being different from the first signal path.

8. A method comprising:
selecting a storage device from multiple selectable storage devices in an enclosure for execution of a device access command, the enclosure communicatively coupled to shared control electronics and the multiple selectable storage devices including a plurality of NVM storage devices and at least one hard disc drive (HDD);
transmitting a device selection instruction from a host external to the enclosure to a first controller using a first signal path, the first signal path being a PCIe electronic interface configured to communicate with the host, wherein each of the plurality of NVM storage devices and the at least one hard disc drive (HDD) are configured to communicate with the host using the PCIe electronic interface via the shared control electronics;
charging a capacitor bank using back EMF generated during spinning down of the at least one HDD, the capacitor bank being used by the plurality of NVM storage devices for power loss protection; and
wherein the shared control electronics is further configured to control (a) charging of the capacitor bank based on current spinning down of the at least one HDD, (b) spinning up of the at least one HDD using a charge on the capacitor bank, (c) and maintaining the charge level of the plurality of NVM storage devices using a charge on the capacitor bank.

9. The method of claim 8, further comprising using the at least one of the plurality of NVM storage device to store firmware for the at least one HDD.

10. The method of claim 8, further comprising using the at least one of the plurality of NVM storage device as write cache for the at least one HDD during spinning up of the at least one HDD.

11. The method of claim 8, wherein the PCIe electronic interface is an NVMe interface.

12. The method of claim 11, wherein the NVMe interface is configured to communicate with the host via an NVMe-OF interface.

13. The method of claim 8, wherein the shared control electronics including a controller for executing the device access command on the selected storage device.

14. A system, comprising:
multiple selectable storage devices in an enclosure communicatively coupled to shared control electronics, the shared control electronics including a first controller for selecting a storage device of the multiple selectable storage devices for execution of a device access command, the multiple selectable storage devices including a plurality of NVM storage devices and at least one hard disc drive (HDD);
a first signal path for transmitting a drive selection instruction from a host external to the enclosure to the first controller the first signal path being a PCIe electronic interface configured to communicate with the host, wherein each of the plurality of NVM storage devices and the at least one hard disc drive (HDD) are configured to communicate with the host using the PCIe electronic interface via the shared control electronics; and
a capacitor bank configured to provide power loss protection to the plurality of NVM storage devices, wherein the capacitor bank is charged using back EMF generated during spinning down of the at least one HDD; and wherein the shared control electronics controls (a) a charging of the capacitor bank based on the current spinning down of one or more of the HDDs, (b) spinning up of the at least one HDD, and (c) maintaining a charge level of the plurality of NVM storage devices using a charge on the capacitor bank.

15. The system of claim 14, wherein at least one of the plurality of NVM storage device is used to store firmware for the at least one HDD.

16. The system of claim 14, wherein the at least one of the plurality of NVM storage device is used as write cache for the at least one HDD during spinning up of the at least one HDD.

* * * * *